(12) United States Patent
Murakami

(10) Patent No.: US 9,694,871 B2
(45) Date of Patent: Jul. 4, 2017

(54) SHOCK ABSORBER

(71) Applicant: Showa Corporation, Gyoda-shi (JP)

(72) Inventor: Yosuke Murakami, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/070,642

(22) Filed: Mar. 15, 2016

(65) Prior Publication Data
US 2016/0288870 A1 Oct. 6, 2016

(30) Foreign Application Priority Data
Mar. 31, 2015 (JP) .................................. 2015-074208

(51) Int. Cl.
*B62K 25/28* (2006.01)
*F16F 9/18* (2006.01)
*F16F 9/46* (2006.01)

(52) U.S. Cl.
CPC ............ *B62K 25/283* (2013.01); *F16F 9/185* (2013.01); *F16F 9/465* (2013.01); *F16F 2230/24* (2013.01)

(58) Field of Classification Search
CPC . B62K 25/283; F16F 9/185; F16F 9/19; F16F 9/34; F16F 9/44; F16F 9/465
USPC .............................................. 188/266.6, 314
See application file for complete search history.

(56) References Cited

U.S. PATENT DOCUMENTS

| | | | | |
|---|---|---|---|---|
| 5,960,915 A | * | 10/1999 | Nezu ....................... | F16F 9/325 188/266.6 |
| 6,155,391 A | * | 12/2000 | Kashiwagi .............. | F16F 9/466 188/266.6 |
| 2003/0136931 A1 | | 7/2003 | Watanabe et al. | |
| 2011/0147147 A1 | * | 6/2011 | Murakami ............... | F16F 9/464 188/314 |
| 2013/0275003 A1 | | 10/2013 | Uchino et al. | |
| 2014/0231200 A1 | * | 8/2014 | Katayama ............... | F16F 9/325 188/314 |
| 2014/0291089 A1 | * | 10/2014 | Konakai ................... | F16F 9/34 188/314 |

(Continued)

FOREIGN PATENT DOCUMENTS

| | | |
|---|---|---|
| EP | 2628974 A | 8/2013 |
| JP | 4667609 B | 4/2011 |
| WO | WO-2010/149652 A | 12/2010 |

OTHER PUBLICATIONS

Extended European Search Report mailed Sep. 13, 2016 for the corresponding European Patent Application No. 16162135.4.

*Primary Examiner* — Vishal Sahni
(74) *Attorney, Agent, or Firm* — Leason Ellis LLP

(57) ABSTRACT

A shock absorber includes: a cylinder; a piston; a piston rod; and a damping-force generating device that controls a flow of oil, caused by sliding of the piston in the cylinder, wherein the damping-force generating device includes: a valve body that generates a damping force according to opening and closing of the valve body on a channel in which the oil flows; a valve seat on which the valve body seats to close the channel; and an actuator that includes a plunger generating thrust to the valve body in a valve closing direction and a plunger chamber in which the oil is filled in order to actuate the plunger, and the plunger chamber communicates with a downstream side in a flowing direction of the oil with reference to a place where the valve body seats on the valve seat.

16 Claims, 7 Drawing Sheets

(56) References Cited

U.S. PATENT DOCUMENTS

2014/0353099 A1\* 12/2014 Yamashita ............ F16F 9/3485
                                                                                                                                            188/314

\* cited by examiner

ONE END SIDE ⟵⟶ OTHER END SIDE
AXIAL DIRECTION

SHOCK ABSORBER

CROSS-REFERENCE TO RELATED APPLICATIONS

This application is based on and claims priority under 35 USC 119 from Japanese Patent Application No. 2015-074208 filed on Mar. 31, 2015, the entire content of which is incorporated herein by reference.

BACKGROUND

1. Technical Field

An embodiment of the present invention relates to a shock absorber including a damping-force generating device that controls a flow of oil occurring due to sliding of a piston in a cylinder and generates a damping force.

2. Related Art

For example, as a shock absorber used as a rear cushion that suspends a rear wheel of a motorcycle on a vehicle body, there is proposed a shock absorber including a cylinder in which the oil is filled, a piston slidably fit in the cylinder, and a piston rod coupled to the piston and extended to an outside of the cylinder. The shock absorber controls a flow of the oil due to the sliding of the piston in the cylinder and adjusts a damping force. As a shock absorber that changes a damping force, there is proposed a shock absorber including a solenoid actuator and configured to perform flow rate control for oil by changing an energization amount of the solenoid actuator.

In such a shock absorber, when a plunger that obtains thrust with a magnetic field generated in a solenoid operates, a plunger chamber is formed inside the solenoid to allow the plunger to operate. Fluid on the outside is guided to a fluid reservoir chamber, which is provided behind the plunger, via a through-hole formed in a rod operably coupled to the plunger. The plunger chamber and the fluid reservoir chamber are partitioned by a bearing. The fluid on the outside is guided to the fluid reservoir chamber via the through-hole of the rod rather than being guided to the plunger chamber. Therefore, the operation of the plunger is not hindered by fluid pressure on the outside, which improves responsiveness of the plunger (see, for example, Japanese Patent No. 4,667,609).

In the case of a shock absorber in which oil is used, a large amount of contaminants such as iron powder caused by friction of a valve and the like are included in the oil. Therefore, in the shock absorber having the configuration explained above, in some case, the contaminants intrude into the plunger that obtains the trust with the magnetic field generated in the solenoid, friction occurs, and a control characteristic is adversely affected. In particular, the contaminants tend to be attracted to and accumulate in a portion magnetized by a magnetic field generated in a coil. The problem due to the contaminants easily occurs.

For example, in the actuator described in Patent Literature 1 (Japanese Patent No. 4,667,609), the oil is prevented from directly intruding into the plunger chamber by the bearing. Even if the contaminants are included in the oil, the contaminants are prevented from intruding into a sliding section of the plunger. Even in such a configuration, the bearing section still cannot be a complete seal. In the bearing section where the rod is supported by the bearing, a flow of the oil occurs a little, for example, through a gap between the bearing and the rod. If the contaminants are included in the oil, the contaminants are pushed into the gap by the pressure of the oil. The contaminants are easily stuck. The plunger chamber in the actuator involves not only the pressure but also a strong magnetic field. Therefore, in particular, when contaminants of a magnetic material such as iron once occur, it is likely that the contaminants are held up and stuck.

In the shock absorber having the configuration, when so-called air entrainment in which air bubbles enter the plunger chamber occurs, during a rise of pressure, a flow of the oil corresponding to a volume change of the air bubbles generates an unintended flow of the oil. Consequently, during the rise of the pressure, harmful effects occur, for example, the actuator cannot withstand the pressure and performs unintended movement.

SUMMARY OF THE INVENTION

An object of at least one embodiment of the present invention is to provide a shock absorber that is less easily affected by contaminants and can suppress occurrence of air entrainment.

A shock absorber according to the at least one embodiment of the present invention includes: a cylinder in which oil is filled; a piston slidably fit in the cylinder; a piston rod that is coupled to the piston and extended to an outside of the cylinder; and a damping-force generating device that controls a flow of the oil, caused by the sliding of the piston in the cylinder, in which the damping-force generating device includes: a valve body that generates a damping force according to opening and closing of the valve body on a channel in which the oil flows; a valve seat on which the valve body seats to close the channel; and an actuator that includes a plunger generating thrust to the valve body in a valve closing direction and a plunger chamber in which the oil is filled in order to actuate the plunger, and the plunger chamber communicates with a further downstream side in a flowing direction of the oil with reference to a part where the valve body seats on the valve seat.

According to the shock absorber discussed above, it is possible to provide a shock absorber that is less easily affected by contaminants and can suppress occurrence of air entrainment.

DESCRIPTION OF EMBODIMENTS

An embodiment of the present invention is explained below with reference to the drawings.

[Structure of a Shock Absorber]

Figure 1:
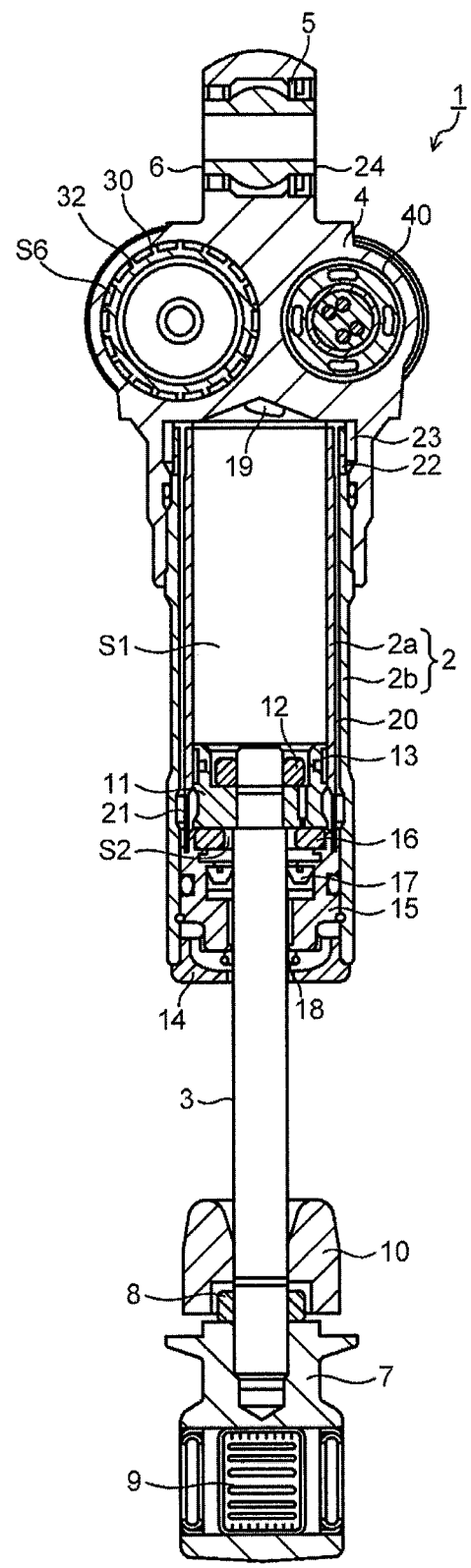
FIG. 1 is a longitudinal sectional view of a shock absorber in an embodiment.
Figure 2:
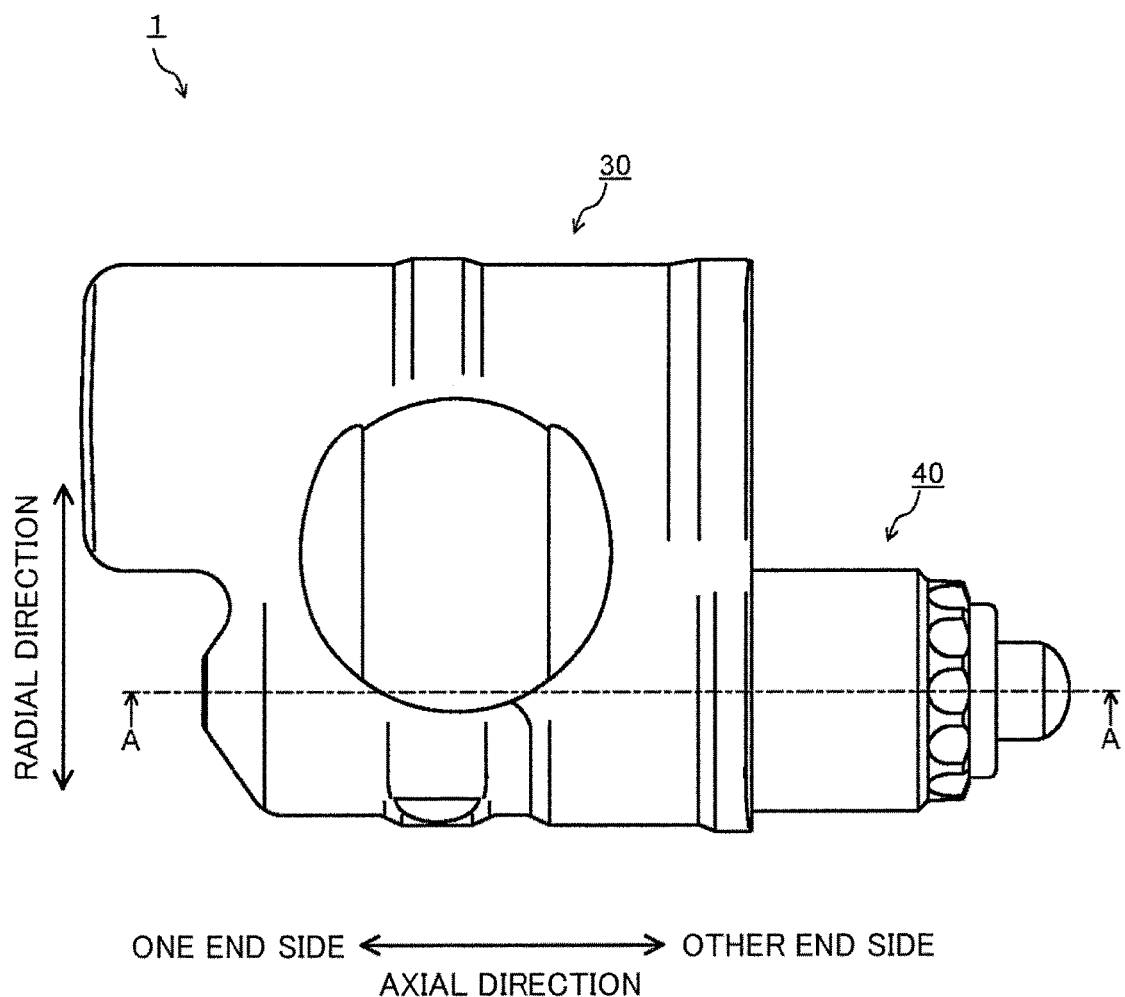
FIG. 2 is a top view of a damper case section of the shock absorber shown in FIG. 1.
Figure 3:
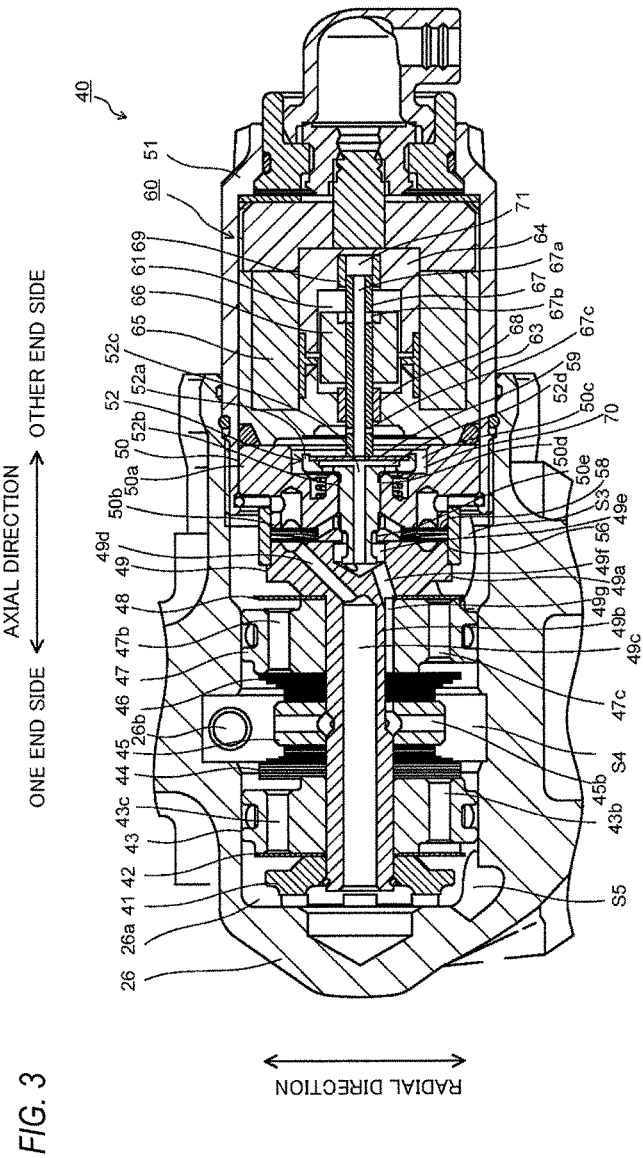
FIG. 3 is an enlarged view of a main part of an A-A line cross section of FIG. 2.
Figure 4:
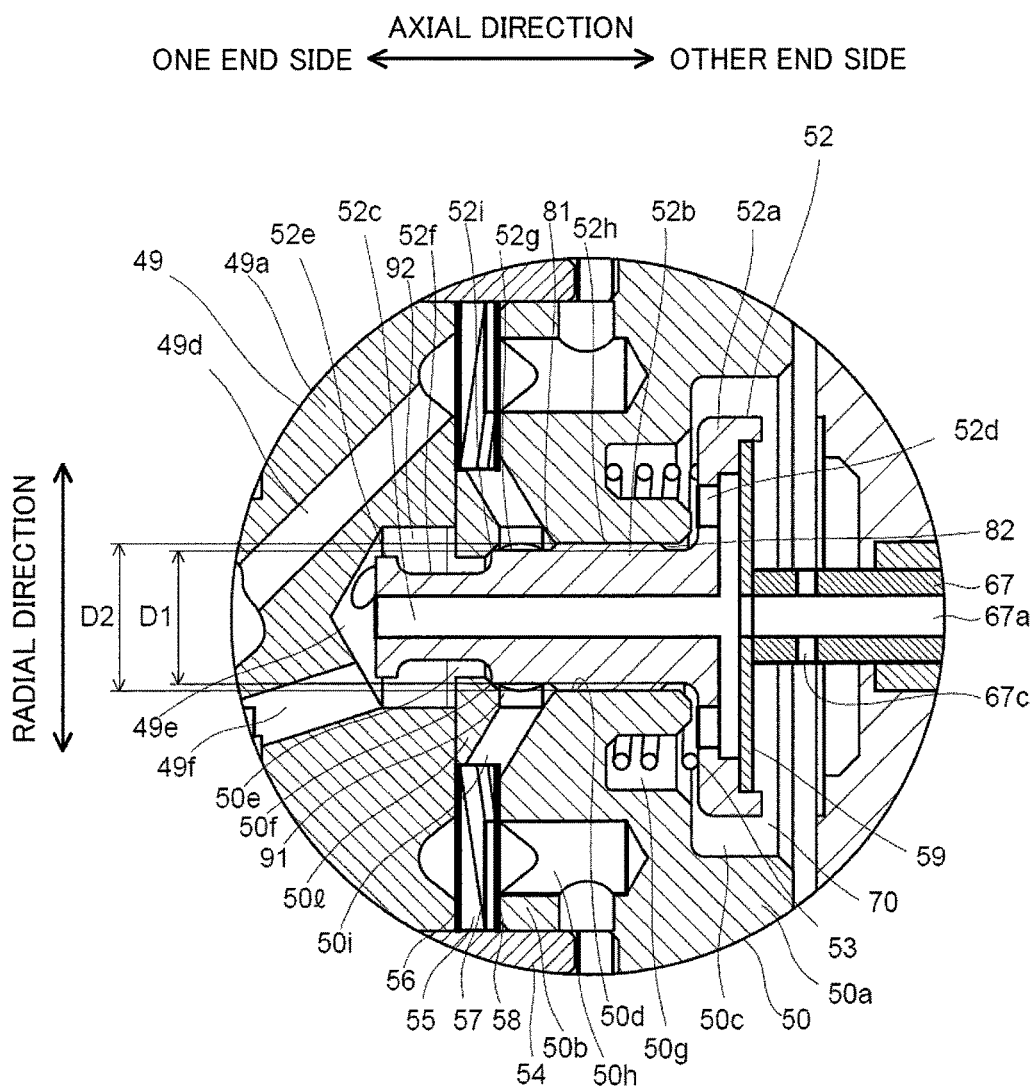
FIG. 4 is a main part enlarged detailed view of FIG. 3.

FIG. 1 is a longitudinal sectional view of a shock absorber 1 in the embodiment. FIG. 2 is a top view of a damping-force generating device shown in FIG. 1. FIG. 3 is an enlarged view of a main part of an A-A line cross section of FIG. 2. FIG. 4 is a main part enlarged detailed view of FIG. 3.

The shock absorber 1 in the embodiment is a rear cushion of an inverted type that suspend a rear wheel of a motorcycle on a vehicle body. In the shock absorber 1, as shown in FIG. 1, a part of a piston rod 3 attached to an axle side is inserted upward into the inside of a cylinder 2 attached to a vehicle body side. A suspension spring (not-shown) is interposed between the cylinder 2 and the piston rod 3.

The cylinder 2 is configured by an inner cylinder 2a and an outer cylinder 2b that form a concentric double tube. A damper case section 4 is attached to the upper end portion of the cylinder 2. In the damper case section 4, as shown in FIG. 2 as well, a reservoir 30 and a damping-force generating device 40 explained below are provided. A part of the damper case section 4 configures a vehicle-body-side attachment section 24. A cylindrical rubber bush 5 is inserted through the vehicle-body-side attachment section 24 in the lateral direction (the left-right direction in FIG. 1) and held. A substantially cylindrical collar 6 is inserted through the inner side of the rubber bush 5 in the lateral direction and held. The upper end portion of the cylinder 2 is attached to the vehicle body of the motorcycle by a shaft inserted through the collar 6 inserted through the vehicle-body-side attachment section 24 and held.

An axle-side attachment member 7 is screwed to the lower end portion of the piston rod 3. Further, the axle-side attachment member 7 is firmly bound by a locknut 8. The lower end portion of the piston rod 3 is attached to a rear-wheel supporting member of the motorcycle via a shaft inserted through a cylindrical collar 9 inserted through the axle-side attachment member 7 in the lateral direction (the left-right direction in FIG. 1) and held. Note that, directly above the axle-side attachment member 7 at the lower end portion of the piston rod 3, a bump rubber 10 for preventing bottoming of the shock absorber 1 in a most compressed state is inserted through the piston rod 3 and fixed.

A piston 11 is attached to the upper end portion of the piston rod 3, which faces the inside of the inner cylinder 2a of the cylinder 2, by a nut 12. The piston 11 is fitted to be capable of sliding in the up-down direction on the inner circumference of the inner cylinder 2a via a piston ring 13 held on the outer circumference of the piston 11.

A space, which is a working oil chamber in which the oil in the inner cylinder 2a of the cylinder 2 actuates, is divided into two oil chambers, i.e., a piston-side oil chamber S1 on the upper side and a rod-side oil chamber S2 on the lower side, by the piston 11. The piston-side oil chamber S1 of the two oil chambers is provided on the side of the piston 11. The rod-side oil chamber S2 of the two oil chambers is provided on the side of the piston rod 3. The oil is filled in the piston-side oil chamber S1 and the rod-side oil chamber S2. That is, in the shock absorber 1, the space in the inner cylinder 2a of the cylinder 2, which is the working oil chamber, is divided by the piston 11. The space includes the rod-side oil chamber S2 formed further on the axle side than the piston 11 and the piston-side oil chamber S1 formed further on the vehicle body side than the piston 11.

As shown in FIG. 1, a cap 14 is attached to a portion through which the piston rod 3 is inserted into a lower surface opening section of the outer cylinder 2b of the cylinder 2. A rod guide 15, through the center of which the piston rod 3 pierces in the up-down direction to be capable of sliding, is fit to the inner circumference at a lower end portion of the outer cylinder 2b. A rebound rubber 16 is fit to the inner circumference of an upper end opening section of the rod guide 15. An oil seal 17 is fit to the inner circumference of an intermediate portion of the rod guide 15. A dust seal 18 is fit to the outer circumference of the lower end portion of the rod guide 15. Note that a leak of the oil from the cylinder 2 is prevented by sealing action of the oil seal 17, and intrusion of dust into the cylinder 2 is prevented by sealing action of the dust seal 18.

In the damper case section 4, as shown in FIG. 1, an oil hole 19 opening to the piston-side oil chamber S1 formed in the inner cylinder 2a of the cylinder 2 is formed. The piston-side oil chamber S1 communicates with a first oil chamber S3 (see FIG. 3) of the damping-force generating device 40 explained below via the oil hole 19. A cylindrical channel 20 is formed between the inner cylinder 2a and the outer cylinder 2b of the cylinder 2. One end (the lower end) of the channel 20 communicates with the rod-side oil chamber S2 via a plurality of oil holes 21 formed at a lower end portion of the inner cylinder 2a. On the other hand, the other end (the upper end) of the channel 20 communicates with a third oil chamber S5 (see FIG. 3) of the damping-force generating device 40, as explained later, via a plurality of oil holes 22 formed at the upper end of the outer cylinder 2b and a channel 23 formed between the damper case section 4 and the outer cylinder 2b.

In the shock absorber 1 in the embodiment, the reservoir 30 and the damping-force generating device 40 are provided side by side in the damper case section 4 attached to the upper end of the cylinder 2. The reservoir 30 includes a bag-like bladder 32. The bladder 32 is a member molded in a bag shape with an elastic body such as rubber and capable of expanding and contracting. Note that gas such as air is filled on the inside of the bladder 32. A space on the outside of the bladder 32 of the reservoir 30 configures a reservoir oil chamber S6. The oil is filled in the inside of the reservoir oil chamber S6. The reservoir oil chamber S6 of the reservoir 30 compensates for the volume of the piston rod 3 that changes according to entrance of the piston rod 3 into or exit of the piston rod 3 from the cylinder 2.

Details of the configuration of the damping-force generating device 40 are explained with reference to FIGS. 3 and 4.

As shown in FIG. 3, the damping-force generating device 40 includes a bottomed cylindrical damper case 26 formed in the damper case section 4 (see FIG. 1) and a case 51, one end side of which is fit to the inner circumference of the other end side opening section of the damper case 26. In a recess 26a of the damper case 26, a valve stopper 41, a compression-side outlet check valve 42, an extension side valve seat member 43, an extension side valve 44, a first channel member 45, a compression side valve 46, a compression-side valve seat member 47, an extension-side outlet check valve 48, a second channel member 49, and a valve seat member 50 are sequentially disposed in the axial direction from one end side to the other end side. The damping-force generating device 40 further includes a solenoid actuator 60 adjacent to the valve seat member 50 in the case 51. Note that the shock absorber 1 in the embodiment includes the solenoid actuator 60. However, the shock absorber 1 is not limited to this and may include an actuator including a driving mechanism other than a solenoid.

A space further on one end side than the extension side valve seat member 43 in the recess 26a is formed as the third oil chamber S5 that communicates with the rod-side oil chamber S2 (see FIG. 1). A space between the extension-side valve seat member 43 and the compression-side valve seat member 47 in the recess 26a is formed as a second oil chamber S4 that is connected to the reservoir oil chamber S6 (see FIG. 1) via a connection path 26b. A space between the compression-side valve seat member 47 and the valve seat member 50 is formed as the first oil chamber S3 that communicates with the piston-side oil chamber S1 (see FIG. 1).

The second channel member 49 includes a large diameter section 49a located on the other end side and a small diameter section 49b extending to one end side from the large diameter section 49a. The valve stopper 41, the compression-side outlet check valve 42, the extension-side valve seat member 43, the extension side valve 44, the first channel member 45, the compression side valve 46, the compression-side valve seat member 47, and the extension-side outlet check valve 48 are respectively formed in annular shapes and are disposed such that the small diameter section 49b of the second channel member 49 is located in the center of these members.

That is, the extension-side outlet check valve 48, the compression-side valve seat member 47, the compression side valve 46, the first channel member 45, the extension side valve 44, the extension-side valve seat member 43, and the compression-side outlet check valve 42 are fit in the small diameter section 49b of the second channel member 49. An end portion on one end side of the small diameter section 49b is locked by the valve stopper 41.

In the extension-side valve seat member 43 formed in the annular shape, a plurality of extension-side inlet oil paths 43b and a plurality of compression-side outlet paths 43c are formed along the circumferential direction of the extension-side valve seat member 43. Note that the extension-side inlet oil paths 43b and the compression-side outlet oil paths 43c are alternately provided along the circumferential direction of the extension-side valve seat member 43. On the other end side (the outlet side) of the extension-side inlet oil paths 43b, the extension side valve 44 including a plurality of disk valves is disposed to be set in contact with the other end side surface of the extension-side valve seat member 43. On the other hand, on one end side (the outlet side) of the compression-side outlet oil paths 43c, the compression-side outlet check valve 42 including a disk valve is disposed to be set in contact with one end side surface of the extension-side valve seat member 43.

Similarly, in the compression-side valve seat member 47 formed in the annular shape, a plurality of compression-side inlet oil paths 47b and a plurality of extension-side outlet oil paths 47c are formed along the circumferential direction of the compression-side valve seat member 47. Note that the compression-side inlet oil paths 47b and the extension-side outlet oil paths 47c are alternately provided along the circumferential direction of the compression-side valve seat member 47. On one end side (the outlet side) of the compression-side inlet oil paths 47b, the compression side valve 46 including a plurality of disk valves is disposed to be in contact with the one end side surface of the compression-side valve seat member 47. On the other hand, on the other end side (the outlet side) of the extension-side outlet oil paths 47c, the extension-side outlet check valve 48 including a disk valve is disposed to be set in contact with the other end side surface of the compression-side valve seat member 47.

In the annular first channel member 45, a plurality of oil paths 45b extending radially from the center in the radial direction are formed. In the small diameter section 49b of the second channel member 49, a linear oil path 49c formed along the axial direction. In the large diameter section 49a, an oil path 49d communicates with the oil path 49c and obliquely extending in the other end direction and the outer circumferential direction is formed. Further, a center portion on the other end side of the large diameter section 49a, an oil path 49e is formed to be recessed. An oil path 49f communicating with the oil path 49e and extending to one end side to pierce through the large diameter section 49a is formed. On one end side of the oil path 49f, a groove extending to one end side along the axial direction on the outer circumferential surface of the small-diameter section 49b and extending in the axial direction of the small diameter section 49b to a part where the oil paths 45b of the first channel member 45 are located is formed. An air gap is formed between the outer circumferential surface of the small diameter section 49b and the inner circumferential surfaces of the compression side valve 46, the compression-side valve seat member 47, and the extension side outlet check valve 48 by the groove. The air gap configures an oil path 49g. The oil path 49g communicates with the oil paths 45b formed in the first channel member 45.

As shown in FIG. 4, the valve seat member 50 is formed in an annular shape. The other end side of the valve seat member 50 is formed as a large diameter section 50a having a larger outer diameter and one end side of the valve seat member 50 is formed as a small diameter section 50b having an outer diameter smaller than the outer diameter of the large diameter section 50a. In the center of the valve seat member 50, a through hole including a large diameter hole 50c, an intermediate diameter hole 50d, and a small diameter hole 50e reduced in diameter stepwise from the other end side to one end side is formed. A valve body 52 is disposed in the through-hole.

The valve body 52 includes a disk-like flange section 52a on the other end side and includes a needle section 52b extending from the center of the flange section 52a to one end side. In the center of the needle section 52b, a connection path 52c including a through-hole piercing through the insides of the needle section 52b and the flange section 52a along the axial direction is formed. That is, the valve body 52 includes the connection path 52c that allows a plunger chamber 61 explained below and a downstream side in a flowing direction of the oil with reference to a place where the valve body 52 seats on a valve seat 50l to communicate with each other. In the flange section 52a, a plurality of oil paths 52d including through-holes piercing through the flange section 52a are formed along the circumferential direction.

A large diameter section 52e is formed at the distal end portion (the one end side end portion) of the needle section 52b. On the rear end side (the other end side) of the large diameter section 52e, a first step section 52f smaller in diameter than the large diameter section 52e is formed. Further, on the rear end side (the other end side) of the first step section 52f, a second step section 52g larger in diameter than the first step section 52f and smaller in diameter than a sliding section 52h on the rear end side (the other end side) is formed. The outer diameter of the second step section 52g is represented as D1. The outer diameter of the sliding section 52h is represented as D2. An annular pressure receiving section 81 (a first pressure receiving section), which is at least a part of the valve body 52, is formed by a difference between the outer diameter D2 and the outer diameter D1. A pressure receiving area of the pressure receiving section 81 is an area of an annular portion formed by the difference (D2−D1) between the outer diameter D2 and the outer diameter D1. A step section on the rear end side (the other end side) of the first step section 52f is formed as a seating section 52i. The seating section 52i seats on a valve seat section 50f of the valve seat 50l, which is a one end side step section of the intermediate diameter hole 50d of the valve seat member 50, to close an oil path including the small diameter hole 50e. The sliding section 52h slides with respect to the intermediate diameter hole 50d of the valve seat member 50, whereby the valve body 52 is capable of moving along the axial direction. The outer diameter D1 of the seating section 52i seating on the valve seat section 50f in the valve body 52 is smaller than a maximum diameter D2 of a pressure receiving surface of the pressure receiving section 81 that receives an oil pressure.

Therefore, the seating section 52i of the valve body 52 generates a damping force according to opening and closing of the seating section 52i on a channel in which the oil flows from an oil path 50i to the small diameter hole 50e and the oil path 49e.

In the valve seat member 50, an annular groove 50g opening to the large diameter hole 50c is formed to be located around the intermediate diameter hole 50d. A coil spring 53 is disposed in the groove 50g. The other end side of the coil spring 53 is in contact with a surface on one end side of the flange section 52a of the valve body 52 and urges the valve body 52 in a valve opening direction (the other end side). An annular leaf spring 59 (a first elastic body) is disposed on the other end side of the flange section 52a. On the other end side of the leaf spring 59, a one end side end portion of an actuation rod 67 of the solenoid actuator 60 is fixed. The valve body 52 is urged in a valve closing direction by a pressing force of the actuation rod 67 and an elastic force of the leaf spring 59.

A cylindrical spacer 54 is attached to surround one end side of the small diameter section 50b of the valve seat member 50 and the other end side of the large diameter section 49a of the second channel member 49. A gap is provided between the small diameter section 50b and the large diameter section 49a by the spacer 54. An oil chamber 55 surrounded by the small diameter section 50b, the large diameter section 49a, and the spacer 54 is formed. In the oil chamber 55, an extension-side check valve 56 including a disk valve, an annular leaf spring 57, and a compression-side check valve 58 including a disk valve are disposed in order from one end side to be held between the large diameter section 49a and the small diameter section 50b. The leaf spring 57 urges the extension-side check valve 56 to the large diameter section 49a side and urges the compression-side check valve 58 to the small-diameter section 50b side.

In the valve seat member 50, an oil path 50h that allows the first oil chamber S3 (see FIG. 3) and the oil chamber 55 to communicate with each other is formed. The compression-side check valve 58 is disposed to cover an opening of the oil path 50h to the oil chamber 55. The compression-side check valve 58 permits an inflow of the oil from the oil path 50h into the oil chamber 55 and blocks a flow of the oil from the oil chamber 55 to the oil path 50h.

On the other hand, the extension-side check valve 56 is disposed to cover an opening of the oil path 49d to the oil chamber 55 formed in the large diameter section 49a of the second channel member 49. The extension-side check valve 56 permits an inflow of the oil from the oil path 49d into the oil chamber 55 and blocks a flow of the oil from the oil chamber 55 to the oil path 49d.

Further, in the valve seat member 50, the oil path 50i obliquely extending from the inner circumference side of the oil chamber 55 in the inner circumferential direction and to the other end side and opening to a portion where the second step section 52g of the valve body 52 is disposed is formed.

The valve body 52 is urged in the valve closing direction by the solenoid actuator 60. The pressure receiving section 81 of the valve body 52, that is, a boundary section between the second step section 52g and the sliding section 52h of the valve body 52 is usually located in the portion of the oil path 50i. As explained above, the outer diameter of the second step section 52g is represented as D1 and the outer diameter of the sliding section 52h is represented as D2. Therefore, pressure corresponding to the pressure receiving area of the pressure receiving section 81, which is an annular region formed by the difference (D2−D1) between the outer diameter D2 and the outer diameter D1 is applied in a direction for opening the valve body 52. When the oil flows into the oil path 50i and oil pressure equal to or larger than predetermined oil pressure is applied to the pressure receiving surface of the valve body 52, the valve body 52 opens resisting the pressing force of the solenoid actuator 60. The oil flows into the second oil chamber S4 shown in FIG. 3 through the oil path 49e, the oil path 49f, and the like formed in the second channel member 49. In this case, the oil path 50i and the like may be a first channel 91 on the upstream side in the flowing direction of the oil with reference to the valve seat section 50f. The small diameter hole 50e, the oil path 49e, the oil path 49f, and the like may be a second channel 92 on the downstream side in the flowing direction of the oil with reference to the valve seat section 50f.

As shown in FIG. 3, the solenoid actuator 60 includes a core 63, the actuation rod 67, a plunger 66, a coil 65, and a core 64.

The solenoid actuator 60 is configured by housing, on the inside of the cylindrical case 51, the bottomed cylindrical two cores 63 and 64, the annular coil 65, the plunger 66 housed on the inside of the cores 63 and 64, the hollow actuation rod 67 that pierces through the axial center of the plunger 66, and the like. Both the end portions in the axial direction of the actuation rod 67 are supported movably in the axial direction by cylindrical guide bushes 68 and 69. One end side of the actuation rod 67 facing the inside of the large diameter hole 50c of the valve seat member 50 presses the valve body 52 via the leaf spring 59. That is, the plunger 66 to which the actuation rod 67 is attached generates thrust in the valve closing direction in the valve body 52.

An oil path 67a is formed along the axial direction in the center of the actuation rod 67. In a part of the actuation rod 67 where the rear end side end portion (the other end side end portion) of the plunger 66 is located, an oil path 67b that allows the oil path 67a and the plunger chamber 61, in which the plunger 66 is housed, to communicate with each other is formed. Further, in the vicinity of the distal end side end portion (the one end side end portion) of the actuation rod 67, an oil path 67c that allows the oil path 67a and the inside of the large diameter hole 50c of the valve seat member 50 to communicate with each other is formed. The oil flowing into the large diameter hole 50c causes backpressure to act on the valve body 52. Therefore, the inside of the large diameter hole 50c changes to a valve-body backpressure chamber 70. That is, the valve-body backpressure chamber 70 is disposed between the small diameter hole 50e, the oil path 49e, the oil path 49f, and the like, which form the second channel, and the plunger chamber 61. The valve-body backpressure chamber 70 is connected to the small diameter hole 50e, the oil path 49e, the oil path 49f, and the plunger chamber 61 and causes oil pressure to act on the valve body 52 in the valve closing direction. In this case, a pressure receiving section 82 (a second pressure receiving section) in the valve body 52 that actually generates the backpressure is at least a part of the valve body 52 different from the pressure receiving section 81. A pressure receiving area of the pressure receiving section 82 is the same as the pressure receiving area of the pressure receiving section 81, that is, the annular area of D2–D1.

The oil in the oil path 49e on the downstream side in the flowing direction of the oil with reference to the valve seat section 50f flows into the plunger chamber 61 through the connection path 52c formed in the valve body 52 and the oil path 67a and the oil path 67b formed in the actuation rod 67. The plunger chamber 61 is filled with the oil. An oil reservoir chamber 71 is formed on the other end side of the plunger chamber 61. The oil reservoir chamber 71 is also filled with the oil flowing into the oil reservoir chamber 71 through the connection path 52c and the oil path 67a. Similarly, the oil in the oil path 49e, which is a channel on the downstream side in the flowing direction of the oil with reference to the valve seat section 50f, flows into the valve-body backpressure chamber 70 through the connection path 52c formed in the valve body 52 and the oil path 67a and the oil path 67c formed in the actuation rod 67. The valve-body backpressure chamber 70 is filled with the oil. That is, the plunger chamber 61 communicates with the downstream side in the flowing direction of the oil with reference to the place where the seating section 52i of the valve body 52 seats on the valve seat section 50f of the valve seat 50l. Therefore, the oil pressure in the plunger chamber 61, the oil reservoir chamber 71, and the valve-body backpressure chamber 70 is the same as the oil pressure in the oil path 49e. The oil pressure in the oil path 49e is the same as the oil pressure in the second oil chamber S4 that communicates with the oil path 49e. Therefore, the oil pressure in the plunger chamber 61, the oil reservoir chamber 71, and the valve-body backpressure chamber 70 is the same as the oil pressure in the second oil chamber S4.

The oil after being damped by the extension side valve 44 and the oil after being damped by the compression side valve 46 are led into the second oil chamber S4. The second oil chamber S4 communicates with the reservoir 30. Therefore, fluctuation in the oil pressure in the second oil chamber S4 is smaller than fluctuations in the first oil chamber S3 and the third oil chamber S5, and moreover the oil pressure in the second oil chamber S4 is low.

Therefore, in this embodiment, compared with when the plunger chamber 61, the oil reservoir chamber 71, and the valve-body backpressure chamber 70 communicate with the first oil chamber S3 and the third oil chamber S5 in which even greater pressure fluctuation and high pressure are exhibited, a flow of the oil and the oil pressure are low. Therefore, a flow that pushes contaminants into the plunger chamber 61, the oil reservoir chamber 71, and the valve-body backpressure chamber 70 together with the oil less easily occurs. It is possible to reduce the likelihood of intrusion of the contaminants. Consequently, for example, it is possible to reduce the likelihood of occurrence of an event in which the contaminants are stuck in the plunger 66, the sliding section of the actuation rod 67, and the like and adversely affect the driving of the valve body 52. Further, it is also possible to reduce the likelihood of occurrence of so-called air entrainment in which air bubbles enter the plunger chamber 61, the oil reservoir chamber 71, and the valve-body backpressure chamber 70.

[Action of the Shock Absorber]

Figure 5:
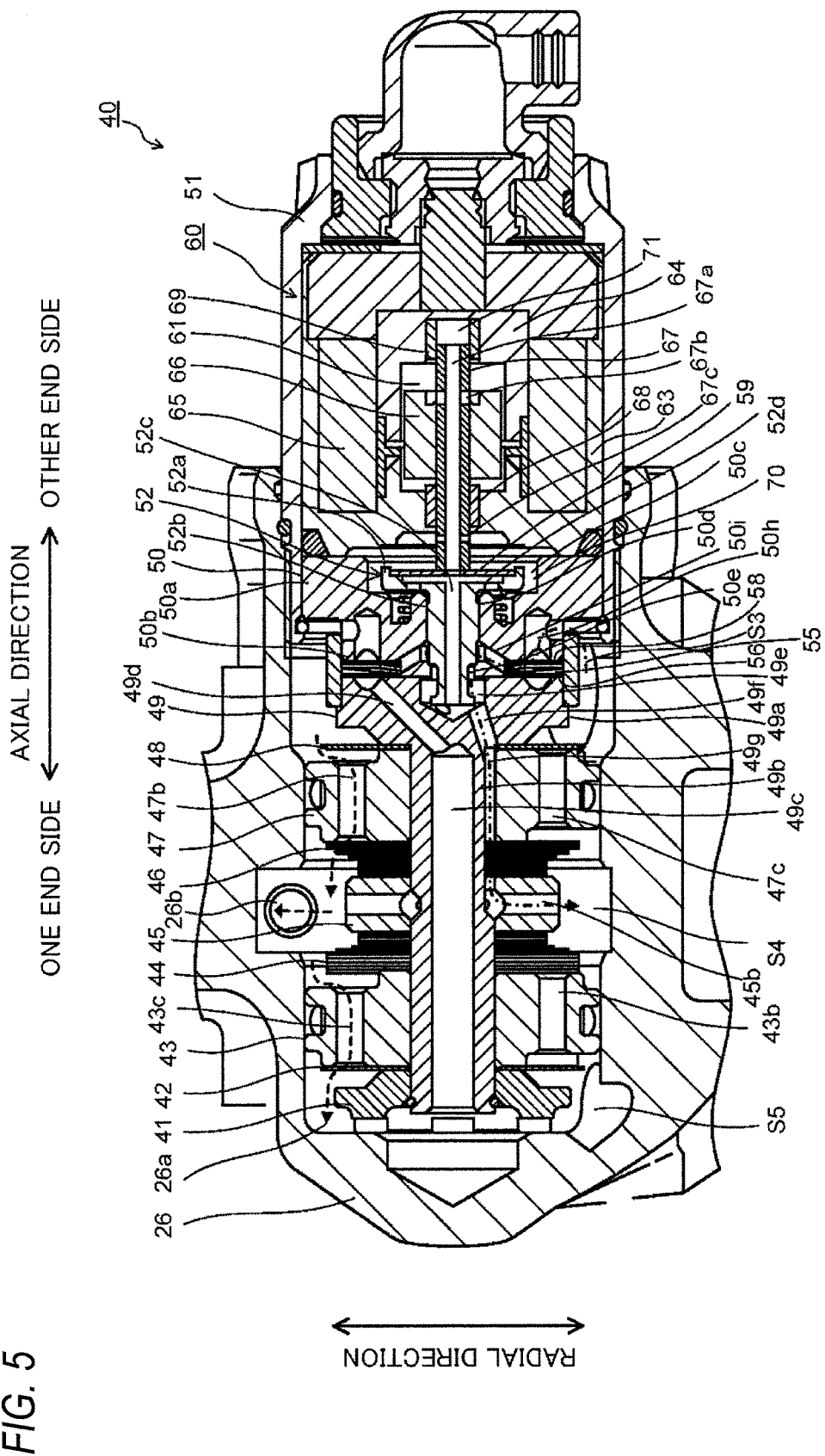
FIG. 5 is a diagram showing a flow of oil during a compression side stroke in a damping-force generating device.
Figure 6:
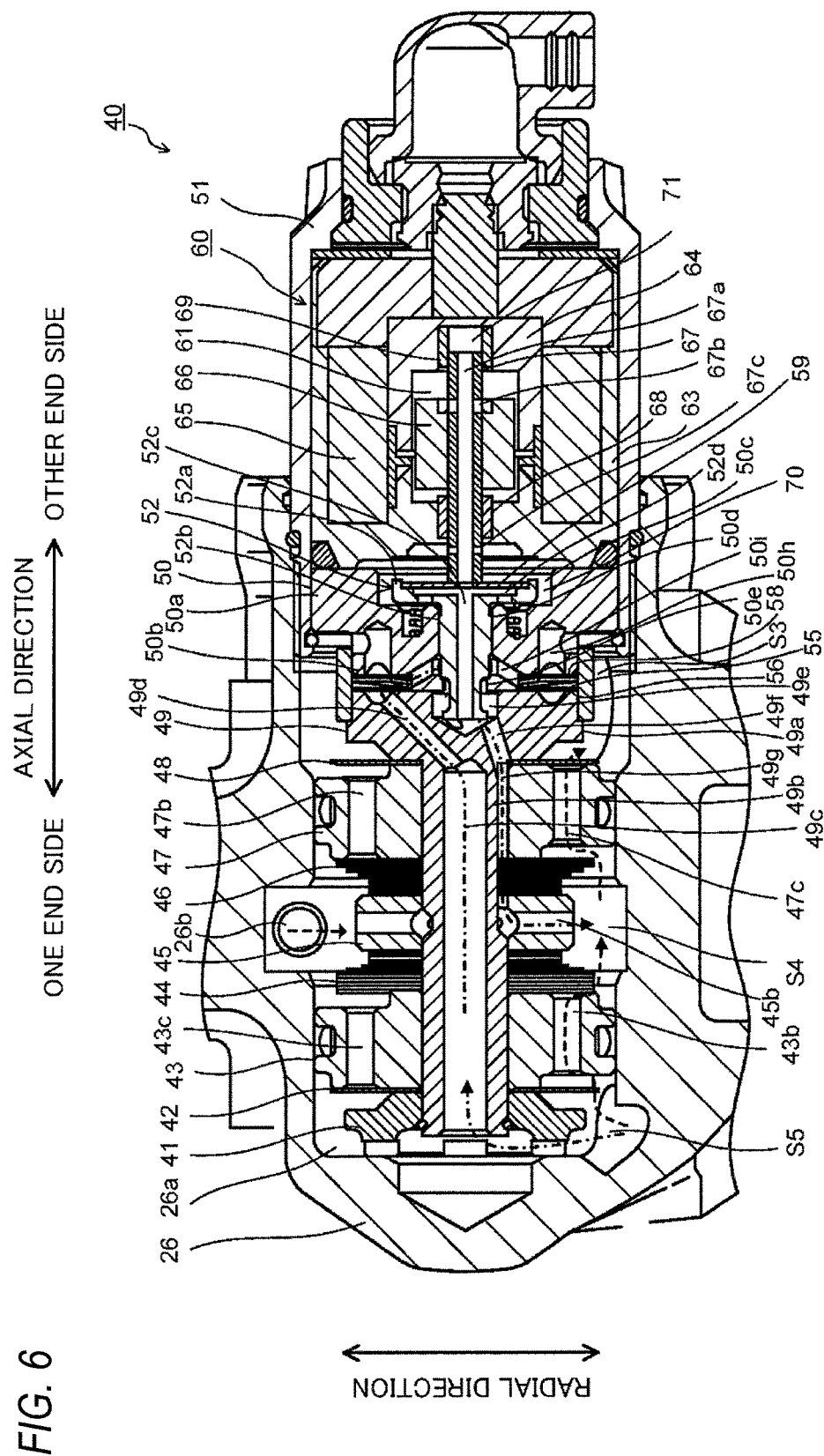
FIG. 6 is a diagram showing a flow of the oil during an extension side stroke in the damping-force generating device.

The action of a compression side stroke and the action of an extension side stroke of the shock absorber 1 configured as explained above are explained with reference to FIGS. 5 and 6. Note that FIG. 5 shows a flow of the oil during the compression side stroke in the damping-force generating device 40 of the shock absorber 1 in the embodiment. FIG. 6 shows a flow of the oil during the extension side stroke in the damping-force generating device 40 of the shock absorber 1 in the embodiment.

(Compression Side Stroke)

When the rear wheel moves up and down following unevenness of a road surface during traveling of the motorcycle, the cylinder 2 and the piston rod 3 of the shock absorber 1 that suspends the rear wheel extend and retract. In the compression side stroke in which the piston rod 3 moves upward relatively to the cylinder 2, the oil in the piston-side oil chamber 51 is compressed by the piston 11 and the pressure of the oil rises. Then, the oil in the piston-side oil chamber 51 is supplied from the oil hole 19 shown in FIG. 1 to the first oil chamber S3 of the damping-force generating device 40 shown in FIG. 5.

During the compression side stroke, the oil supplied to the first oil chamber S3 of the damping-force generating device 40 flows into the second oil chamber S4. A part of the oil flows into the reservoir oil chamber S6 and the remaining oil flows into the third oil chamber S5. Specifically, as indicated by a chain line arrow in FIG. 5, a part of the oil supplied to the first oil chamber S3 passes through the compression-side inlet oil paths 47b of the compression-side valve seat member 47 from the first oil chamber S3, pushes the compression side valve 46 including the plurality of disk valves open, and flows into the second oil chamber S4. On the other hand, the remaining oil supplied to the first oil chamber S3 flows into the second oil chamber S4 via, for example, a gap between the valve body 52 and the valve seat 50l. At this point, the oil that has passed through the compression side valve 46 merges with the oil flowing from the first oil chamber S3 via, for example, the gap between the valve body 52 and the valve seat 50l and flows into the second oil chamber S4. In the oil flowed into the second oil chamber S4, a part of the oil equivalent to an entrance volume of the piston rod 3 into the cylinder 2 flows to the reservoir oil chamber S6. The remaining oil passes through the compression-side outlet oil paths 43c of the extension-side valve seat member 43, pushes the compression-side outlet check valve 42 disposed in an outlet portion of the compression-side outlet oil paths 43c open, and flows into the third oil chamber S5. The oil flowed into the third oil chamber S5 flows into the rod-side oil chamber S2 from the third oil chamber S5 through the channel 23, the oil hole 22 formed in the outer cylinder 2b of the cylinder 2, the channel 20 between the inner cylinder 2a and the outer cylinder 2b, and the oil holes 21 formed in the inner cylinder 2a shown in FIG. 1. At this point, a compression-side damping force is generated in the shock absorber 1 by flow resistance of the oil passing through the compression-side valve 46.

As indicated by an alternate long and short dash line arrow in FIG. 5, a part of the oil supplied to the first oil chamber S3 passes through the oil path 50h formed in the valve seat member 50, pushes the compression-side check valve 58 (see FIG. 4) disposed in an outlet portion of the oil path 50h open, and flows into the oil chamber 55. The oil flowed into the oil chamber 55 further flows into the oil path 50i formed in the valve seat member 50, opens the valve body 52 pressed in the valve closing direction by the solenoid actuator 60, passes through the oil path 49e, the oil path 49f, and the oil path 49g formed in the second channel member 49, further flows into the second oil chamber S4 through the oil paths 45b formed in the first channel member 45, and merges with the oil passed through the compression side valve 46.

In the flow of the oil, the oil pushes the valve body 52 open under the balance of force in the valve closing direction acting on one end side by the solenoid actuator 60 and the leaf spring 59 and force in the valve opening direction acting on the other end side of the coil spring 53. In this case, it is possible to change an opening degree of the valve body 52 (valve opening pressure of the valve body 52) by changing an electric current supplied to the solenoid actuator 60, adjusting the thrust generated in the solenoid actuator 60, and controlling force in the valve closing direction to the valve seat section 50f of the valve body 52. The flow resistance of the oil passing through the gap between the seating section 52i of the valve body 52 and the valve seat section 50f is adjusted by changing the supply current to the solenoid actuator 60 and adjusting the opening degree of the valve body 52 in this way. Consequently, it is possible to adjust the magnitude of a damping force generated when the oil passes through the gap between the valve body 52 and the valve seat section 50f.

Specifically, when the supply current to the solenoid actuator 60 is small, a pressing force to the valve seat section 50f of the valve body 52 by the thrust of the solenoid actuator 60 decreases and the valve opening pressure of the valve body 52 also decreases. Therefore, the opening degree of the valve body 52 increases, the flow resistance of the oil flowing in the valve body 52 decreases, the compression-side damping force generated by the flow resistance also decreases.

Conversely, when the supply current to the solenoid actuator 60 is large, the pressing force to the valve seat section 50f of the valve body 52 by the thrust of the solenoid actuator 60 increases and the valve opening pressure of the valve body 52 also increases. Therefore, the opening degree of the valve body 52 decreases, the oil flowing in the valve body 52 is narrowed and the flow resistance of the oil increases, and the compression-side damping force generated by the flow resistance also increases.

In the compression side stroke, as indicated by a chain line arrow in FIG. 5, the oil of an amount equivalent to an entrance volume of the piston rod 3 into the inner cylinder 2a of the cylinder 2 is supplied from the second oil chamber S4 to the reservoir oil chamber S6 (see FIG. 1) of the reservoir 30 through the connection path 26b. Therefore, the bladder 32 of the reservoir 30 contracts and the gas inside the bladder 32 is compressed. A capacity change in the inner cylinder 2a involved in the entrance of the piston rod 3 into the inner cylinder 2a of the cylinder 2 is compensated by the compression of the gas.

(Extension Side Stroke)

The action during the extension side stroke of the shock absorber 1 is explained with reference to FIG. 6.

In the extension side stroke in which the piston rod 3 moves down relatively to the cylinder 2, the piston 11 moves down in the inner cylinder 2a of the cylinder 2 together with the piston rod 3. Therefore, the oil in the rod-side oil chamber S2 is compressed by the piston 11 and the pressure of the oil rises. Then, the oil in the rod-side oil chamber S2 is supplied to the third oil chamber S5 of the damping-force generating device 40 shown in FIG. 6 through the oil holes 21 formed in the inner cylinder 2a, the channel 20 between the inner cylinder 2a and the outer cylinder 2b, and the oil hole 22 and the channel 23 formed in the outer cylinder 2b shown in FIG. 1.

During the extension side stroke, the oil supplied to the third oil chamber S5 of the damping-force generating device 40 flows into the second oil chamber S4, merges with the oil flowing from the reservoir oil chamber S6, and flows into the first oil chamber S3. Specifically, as indicated by a chain line arrow in FIG. 6, a part of the oil supplied to the third oil chamber S5 passes through the extension-side inlet oil paths 43b of the extension-side valve seat member 43 from the third oil chamber S5, pushes the extension side valve 44 provided in the outlet portion of the extension-side inlet oil paths 43b open, and flows into the second oil chamber S4. On the other hand, the remaining oil supplied to the third oil chamber S5 flows into the second oil chamber S4 via, for example, the gap between the valve body 52 and the valve seat 501. At this point, the oil passed through, for example, the extension side valve 44 and the gap between the valve body 52 and the valve seat 501 merges with the oil equivalent to an exit volume of the piston rod 3 from the cylinder 2 flowing from the reservoir oil chamber S6, and flows into the second oil chamber S4. The oil flowed into the second oil chamber S4 passes through the extension-side outlet oil paths 47c of the compression-side valve seat member 47, pushes the extension-side outlet check valve 48 provided in the outlet portion of the extension-side outlet oil paths 47c open, and flows into the first oil chamber S3. The oil flowed into the first oil chamber S3 flows into the piston-side oil chamber 51 from the first oil chamber S3 through the oil hole 19 shown in FIG. 1. At this point, an extension-side damping force is generated in the shock absorber 1 by flow resistance of the oil passing through the extension side valve 44.

As indicated by an alternate long and short dash line in FIG. 6, a part of the oil supplied to the third oil chamber S5 passes through the oil path 49c and the oil path 49d of the second channel member 49, pushes the extension-side check valve 56 (see FIG. 4) disposed in the outlet portion of the oil path 49d open, and flows into the oil chamber 55. The oil flowed into the oil chamber 55 further flows into the oil path 50i formed in the valve seat member 50, opens the valve body 52 pressed in the valve closing direction by the solenoid actuator 60, passes through the oil path 49e, the oil path 49f, and the oil path 49g formed in the second channel member 49, further flows into the second oil chamber S4 through the oil paths 45b formed in the first channel member 45, and merges with the oil passed through the extension side valve 44.

In the flow of the oil, the oil pushes the valve body 52 open under the balance of force in the valve closing direction acting on one end side by the solenoid actuator 60 and the leaf spring 59 and force in the valve opening direction acting on the other end side of the coil spring 53. In this case, it is possible to change an opening degree of the valve body 52 (valve opening pressure of the valve body 52) by changing an electric current supplied to the solenoid actuator 60, adjusting the thrust generated in the solenoid actuator 60, and controlling force in the valve closing direction to the valve seat section 50f of the valve body 52. The flow resistance of the oil passing through the gap between the seating section 52i of the valve body 52 and the valve seat section 50f is adjusted by changing the supply current to the solenoid actuator 60 and adjusting the opening degree of the valve body 52 in this way. Consequently, it is possible to adjust the magnitude of a damping force generated when the oil passes through the gap between the valve body 52 and the valve seat section 50f.

Specifically, when the supply current to the solenoid actuator 60 is small, a pressing force to the valve seat section 50f of the valve body 52 by the thrust of the solenoid actuator 60 decreases and the valve opening pressure of the valve body 52 also decreases. Therefore, the opening degree of the valve body 52 increases, the flow resistance of the oil flowing in the valve body 52 decreases, and the extension-side damping force generated by the flow resistance also decreases.

Conversely, when the supply current to the solenoid actuator 60 is large, the pressing force to the valve seat section 50f of the valve body 52 by the thrust of the solenoid actuator 60 increases and the valve opening pressure of the valve body 52 also increases. Therefore, the opening degree of the valve body 52 decreases, the oil flowing in the valve body 52 is narrowed and the flow resistance of the oil increases, and the extension-side damping force generated by the flow resistance also increases.

In the extension side stroke, as indicated by a chain line arrow in FIG. 6, the oil of an amount equivalent to an exit volume the piston rod 3 from the inner cylinder 2a of the cylinder 2 flows into the second oil chamber S4 from the reservoir oil chamber S6 of the reservoir 30 (see FIG. 1) through the connection path 26b and merges with the oil passed through the extension side valve 44. The merged oil passes through the extension-side outlet oil paths 47c of the compression-side valve seat member 47 from the second oil chamber S4, pushes the extension-side outlet check valve 48 provided in the outlet portion of the extension-side outlet oil paths 47c open, and flows into the first oil chamber S3. The oil flowed into the first oil chamber S3 flows into the piston-side oil chamber S1 from the first oil chamber S3 through the oil hole 19 shown in FIG. 1. Therefore, the bladder 32 of the reservoir 30 expands and the gas inside the bladder 32 expands. A capacity change in the inner cylinder 2a involved in the exit of the piston rod 3 from the inner cylinder 2a of the cylinder 2 is compensated by the expansion of the gas.

(In Case of a Fail)

The action of the shock absorber 1 in case of a fail in which the solenoid actuator 60 fails because of some cause and does not normally operate is explained with reference to FIG. 7.

In case of the fail in which the solenoid actuator 60 does not normally operate, the thrust (an electromagnetic force) for moving the valve body 52 in the valve closing direction (to one end side) resisting the coil spring 53 that urges the valve body 52 in the valve opening direction is not generated. Therefore, the valve body 52 moves in the valve opening direction (to the other end side) with the urging force of the coil spring 53. When the shock absorber does not have a fail-safe function, the valve body 52 changes to a full open state and the flow resistance of the oil passing through the valve body 52 decreases. Therefore, the compression-side and extension-side damping forces suddenly decrease and operation stability of the motorcycle is impaired.

Figure 7:
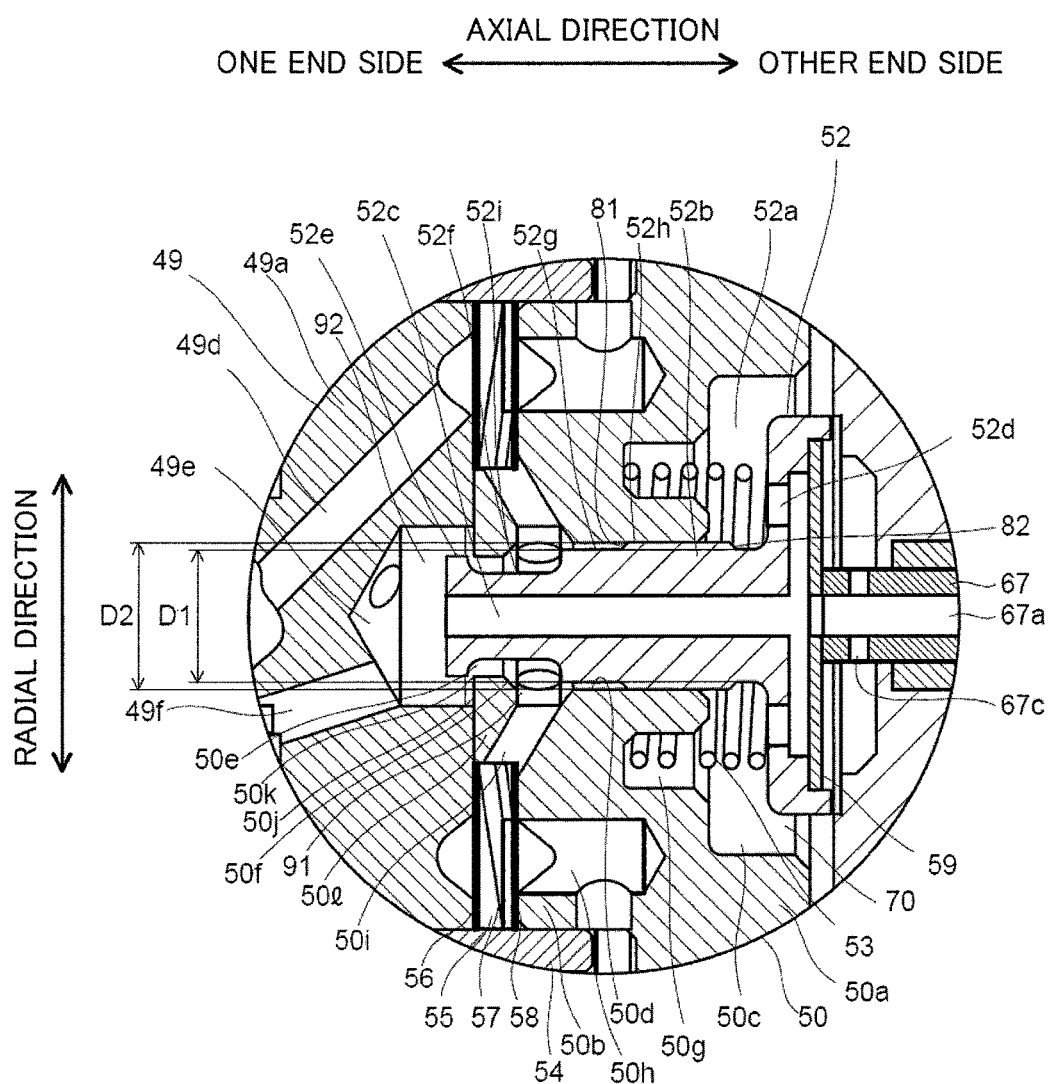
FIG. 7 is a main part enlarged detailed view showing a state of a valve body in case of a fail.

In the shock absorber 1 in this embodiment, in a state in which the valve body 52 moves farthest in the valve opening direction (a state in which the coil spring 53 expands greatest inside the space of the valve-body backpressure chamber 70, the large diameter hole 50c, and the groove 50g), as shown in FIG. 7, the large diameter section 52e formed at the distal end portion (the one end side end portion) of the needle section 52b of the valve body 52 is stopped in a position close to a one end side end portion 50j of the valve seat member 50. In this state, a slight gap 50k in which a channel is narrowed is formed between the large diameter section 52e and the one end side end portion 50j. The gap 50k permits the flow of the oil. That is, the gap 50k functioning as a channel is formed between the large diameter section 52e of the valve body 52 and a part different from the valve seat section 50f. The oil flows in the gap 50k. A damping force is generated by the flow resistance of the oil flowing in the gap 50k and the fail-safe function is exhibited. That is, a sudden decrease in a damping force due to a sudden increase in the oil passing through the valve body 52 is prevented. Deterioration in the operation stability of the motorcycle is prevented.

Note that in case of the fail, a damping force is generated by flow resistance generated by the gap 50k formed between the large diameter section 52e of the valve body 52 and the one end side end portion 50j of the valve seat member 50. Because of this, the upstream side of the gap 50k exhibits high pressure while the downstream side of the gap 50k exhibits low pressure. Therefore, in this case, unlike the normal time, the upstream side of the gap 50k is the first channel 91 and the downstream side of the gap 50k is the second channel 92.

As explained above, in the shock absorber 1 in this embodiment, it is possible to reduce the likelihood of intrusion of the contaminants into the plunger chamber 61, the oil reservoir chamber 71, and the valve-body backpressure chamber 70 together with the oil. For example, it is possible to reduce the likelihood of occurrence of an event in which the contaminants are stuck in the plunger 66, the sliding section of the actuation rod 67, and the like and adversely affect the driving of the valve body 52. Further, it is also possible to reduce the likelihood of occurrence of so-called air entrainment in which air bubbles enter the plunger chamber 61, the oil reservoir chamber 71, and the valve-body backpressure chamber 70.

In the shock absorber 1 in this embodiment, besides the thrust of the solenoid actuator 60, the urging force by the leaf spring 59 is applied as the force acting on the valve body 52 in the valve closing direction servers as the force separated from the solenoid actuator 60. Therefore, it is possible to prevent a delay in movement of the valve body 52 due to, for example, a response delay of the solenoid actuator 60 from occurring. Consequently, it is possible to prevent pulsation and oscillation of pressure and a damping force due to the delay in the movement of the valve body 52.

In the shock absorber 1 in this embodiment, the damping-force generating device 40 includes the compression side valve 46 that generates a damping force in the compression side stroke and the extension side valve 44 that generates a damping force in the extension side stroke. That is, in addition to a structure for generating a damping force including a damping force changing device by the seating section 52i of the valve body 52 and the valve seat section 50f of the valve seat 50l, the shock absorber 1 includes a separately provided structure for generating a damping force. Therefore, an adjustment range of the damping force increases.

In the shock absorber 1 in this embodiment, the second oil chamber S4 functioning as the downstream side channel of the oil flowing in a damping generation part during the compression side stroke and the downstream side channel of the oil flowing in a damping generation part during the compression side stroke communicates with the reservoir 30. Therefore, the oil in the high-pressure oil chamber (the piston-side oil chamber S1 on the upstream side during the compression side stroke/the rod-side oil chamber S2 on the upstream side during the extension side stroke) passes through only the compression side valve 46 and the gap between the valve body 52 and the valve seat 50l in the compression side stroke and passes through only the extension side valve 44 and the gap between the valve body 52 and the valve seat 50l during the extension side stroke. That is, in both the strokes of the compression side stroke and the extension side stroke, the oil in the high-pressure oil chamber always passes only the damping generation parts in the respective strokes and does not branch to other parts on the upstream side of the damping generation parts. Therefore, it is possible to more easily and stably obtain a desired damping force by setting only the damping generation parts.

In both the strokes of the compression side stroke and the extension side stroke, the rod-side oil chamber S2 on the downstream side in the damping generation part during the compression side stroke and the piston-side oil chamber S1 on the downstream side in the damping generation part during the extension side stroke communicate with the reservoir oil chamber S6, with no throttle therebetween. The pressure in the downstream side chambers is maintained at pressure same as the pressure in the reservoir oil chamber S6 (encapsulating pressure in a gas chamber). Therefore, inversion responsiveness from the extension side stroke to the compression side stroke and inversion responsiveness from the compression side stroke to the extension side stroke (delays in generation of the compression side damping force and the extension side damping force due to oil elasticity and air bubbles) are determined by only the encapsulating pressure in the gas chamber and are stabilized.

The shock absorber 1 in this embodiment includes the coil spring 53 that urges the valve body 52 in the valve opening direction. Consequently, for example, when the solenoid actuator 60 fails, it is possible to surely move the valve body 52 in the valve opening direction from the valve seat section 50f with the urging force by the coil spring 53. Therefore, even when the solenoid actuator 60 fails, the slight gap 50k functioning as the channel is formed between the large diameter section 52e and the one end side end portion 50j. It is possible to more surely generate a damping force.

In the above explanation in this embodiment, the shock absorber 1 does not include a pilot structure and includes the valves disposed in parallel to the extension side valve 44 and the compression side valve 46 by the disk valves to perform an additional change of a damping force. However, naturally, it is possible to apply the same structure to a pilot valve. For example, in a shock absorber including a damping-force generating mechanism including one main valve, one pilot chamber for causing the internal pressure in a valve closing direction of the one main valve to act on the one main valve, and a damping-force adjusting unit that adjust the internal pressure of the pilot chamber, naturally, the valve body 52, the valve seat 50l, and the like of the present invention may be applied to the damping-force adjusting unit.

In the example explained in this embodiment, the present invention is applied to the shock absorber 1 used as the rear cushion of the motorcycle in which the damping-force generating device 40 is provided on the outside of the cylinder 2. However, the present invention can also be applied to a shock absorber used as a rear cushion in which the damping-force generating device 40 is compactly built in the piston 11 on the inside of the cylinder 2. By providing the damping-force generating device 40 on the inside of the piston 11 in this way, the damping-force generating device 40 does not project to the outside of the shock absorber 1. The shock absorber 1 can be assembled in a compact configuration.

In the example explained in this embodiment, the present invention is applied to the shock absorber of the inverted type in which the cylinder is attached to the vehicle body side and the piston rod is attached to the axle side. Further, naturally, the present invention can also be applied to a shock absorber of an upright type in which the piston rod is attached to the vehicle body side and the cylinder is attached to the axle side.

Naturally, when the present invention is applied to a shock absorber used as a front fork of a motorcycle in which a damping-force generating device is provided on the outside of a cylinder or an inner tube or an outer tube, or a shock absorber used as a front fork in which a damping-force generating device is compactly built in a piston on the inside of a cylinder or an inner tube or an outer tube, effects similar to those described above can be obtained. Note that, naturally, the present invention can also be applied to a cylinder and a piston slidably fit in the cylinder even in the case of a structure in which the piston directly slide in an inner tube.

In the example explained in this embodiment, the present invention is applied to a shock absorber used as the rear cushion that suspends the rear wheel of the motorcycle on the vehicle body. Further, naturally, the present invention can also be applied to a shock absorber that suspends a wheel of any vehicle other than the motorcycle.

While the invention has described several embodiments, however, these embodiments are presented as examples and are not intended to limit the scope of the invention. These new embodiments can be implemented in other various forms. Various omissions, substitutions, and changes can be made without departing from the spirit of the invention. These embodiments and modifications are included in the scope and the gist of the invention and included in the inventions described in claims and a scope of equivalents of the inventions.

What is claimed is:

1. A shock absorber comprising:
a cylinder in which oil is filled;
a piston slidably fit in the cylinder;
a piston rod that is coupled to the piston and extended to an outside of the cylinder; and
a damping-force generating device that controls a flow of the oil, caused by sliding of the piston in the cylinder, wherein
the damping-force generating device includes:
a valve body that generates a damping force according to opening and closing of the valve body on a channel in which the oil flows;
a valve seat on which the valve body seats to close the channel; and
an actuator that includes a plunger generating thrust to the valve body in a valve closing direction and a plunger chamber in which the oil is filled in order to actuate the plunger,
the plunger chamber communicates with a downstream side in a flowing direction of the oil with reference to a place where the valve body is seated on the valve seat,
the valve seat includes a valve seat section on which the valve body seats,
the channel includes a first channel provided on an upstream side in the flowing direction of the oil with reference to the valve seat section and a second channel provided on a downstream side in the flowing direction of the oil with reference to the valve seat section,
the shock absorber further comprises a valve-body back-pressure chamber that communicates with the second channel and the plunger chamber and causes oil pressure to act on the valve body in the valve closing direction,
a first pressure receiving section, which is at least a part of the valve body, receives oil pressure of the first channel in a valve opening direction,
a second pressure receiving section, which is at least a part of the valve body that is different from the first pressure receiving section receives oil pressure of the valve-body backpressure chamber, which communicates with the second channel, in the valve closing direction, a pressure receiving area of the first pressure receiving section and a pressure receiving area of the second pressure receiving section are same, the valve body includes a seating section seating on the value seat section, and a diameter of the seating section is smaller than a maximum diameter of the first pressure receiving section.

2. The shock absorber according to claim 1, wherein the valve body includes a connection path that allows the plunger chamber and the downstream side in the flowing direction of the oil with reference to a place, where the valve body seats on the valve seat, to communicate with each other.

3. The shock absorber according to claim 2, wherein the connection path is pierced through an inside of the valve body in an opening and closing direction of the valve body.

4. The shock absorber according to claim 1, further comprising:
a piston-side oil chamber provided on a piston side of two oil chambers formed by dividing a space in the cylinder into two chambers by the piston;
a rod-side oil chamber provided on a piston-rod side of the two oil chambers formed by dividing the space in the cylinder into the two chambers by the piston; and
a reservoir that compensates for a volume of the piston rod that changes according to entrance of the piston rod into, or exit of the piston rod from the cylinder, wherein the second channel communicates with the reservoir.

5. The shock absorber according to claim 4, wherein the damping-force generating device further includes:
a compression side valve that generates a damping force in a compression side stroke; and
an extension side valve that generates a damping force in an extension side stoke.

6. The shock absorber according to claim 5, wherein the reservoir is provided on a downstream side of the compression side valve in the compression side stroke and a downstream side of the extension side valve in the extension side stroke.

7. The shock absorber according to claim 1, wherein, when the valve body moves farthest in a valve opening direction from the valve seat section, a gap where the channel is narrowed is formed between at least a part of the valve body and the valve seat, and the oil flows into the gap to generate the damping force.

8. The shock absorber according to claim 1, wherein the damping-force generating device further includes a first elastic body that urges the valve body in the valve closing direction, and
the plunger moves the valve body in the valve closing direction via the first elastic body.

9. The shock absorber according to claim 8, wherein the damping-force generating device further includes a second elastic body that urges the valve body in a valve opening direction.

10. The shock absorber according to claim 2, further comprising:
a piston-side oil chamber provided on a piston side of two oil chambers formed by dividing a space in the cylinder into two chambers by the piston;
a rod-side oil chamber provided on a piston-rod side of the two oil chambers formed by dividing the space in the cylinder into the two chambers by the piston; and
a reservoir that compensates for a volume of the piston rod that changes according to entrance of the piston rod into, or exit of the piston rod from the cylinder, wherein the second channel communicates with the reservoir.

11. The shock absorber according to claim 3, further comprising:
a piston-side oil chamber provided on a piston side of two oil chambers formed by dividing a space in the cylinder into two chambers by the piston;
a rod-side oil chamber provided on a piston-rod side of the two oil chambers formed by dividing the space in the cylinder into the two chambers by the piston; and
a reservoir that compensates for a volume of the piston rod that changes according to entrance of the piston rod into, or exit of the piston rod from the cylinder, wherein the second channel communicates with the reservoir.

12. The shock absorber according to claim 10, wherein the damping-force generating device further includes:
a compression side valve that generates a damping force in a compression side stroke; and
an extension side valve that generates a damping force in an extension side stoke.

13. The shock absorber according to claim 3, wherein the damping-force generating device further includes:
a compression side valve that generates a damping force in a compression side stroke; and
an extension side valve that generates a damping force in an extension side stoke.

14. The shock absorber according to claim 12, wherein the reservoir is provided on a downstream side of the compression side valve in the compression side stroke and a downstream side of the extension side valve in the extension side stroke.

15. The shock absorber according to claim 13, wherein the reservoir is provided on a downstream side of the compression side valve in the compression side stroke and a downstream side of the extension side valve in the extension side stroke.

16. The shock absorber according to claim 1, wherein the first channel and the second channel are separate and spaced apart from one another.

* * * * *